United States Patent
Vynckier

(10) Patent No.: US 7,101,935 B2
(45) Date of Patent: Sep. 5, 2006

(54) LONGITUDINAL SHRINK FILMS

(75) Inventor: Denis Léon Vynckier, Deinze (BE)

(73) Assignee: Plastic Suppliers, Inc., Columbus, OH (US)

( * ) Notice: Subject to any disclaimer, the term of this patent is extended or adjusted under 35 U.S.C. 154(b) by 0 days.

(21) Appl. No.: 11/009,018

(22) Filed: Dec. 13, 2004

(65) Prior Publication Data

US 2005/0100698 A1    May 12, 2005

Related U.S. Application Data

(62) Division of application No. 10/771,346, filed on Feb. 5, 2004, now Pat. No. 6,897,260.

(60) Provisional application No. 60/445,272, filed on Feb. 6, 2003.

(51) Int. Cl.
C08F 6/26 (2006.01)
C08L 23/00 (2006.01)
C08L 25/04 (2006.01)
C08L 25/08 (2006.01)

(52) U.S. Cl. ............... 525/191; 525/240; 525/241
(58) Field of Classification Search ............... 525/191, 525/240, 241
See application file for complete search history.

(56) References Cited

U.S. PATENT DOCUMENTS 4,255,315 A * 3/1981 Anspon .................. 524/485
5,230,906 A * 7/1993 Mueller .................. 425/89

\* cited by examiner

Primary Examiner—Nathan M. Nutter
(74) Attorney, Agent, or Firm—Gilberto M. Villacorta; Sunit Talapatra; Foley & Lardner LLP

(57) ABSTRACT

A heat-shrinkable film and a method of its manufacture are provided. In an exemplary embodiment, a polystyrene film exhibits heat-induced growth in the cross direction of great than or equal to 5% with greater than or equal to 30% concomitant shrinkage in the machine direction. The films may comprise crystal polystyrene, high impact polystyrene, and/or elastomers. A method of manufacture is disclosed which includes a post-extrusion temperature conditioning step.

4 Claims, 3 Drawing Sheets

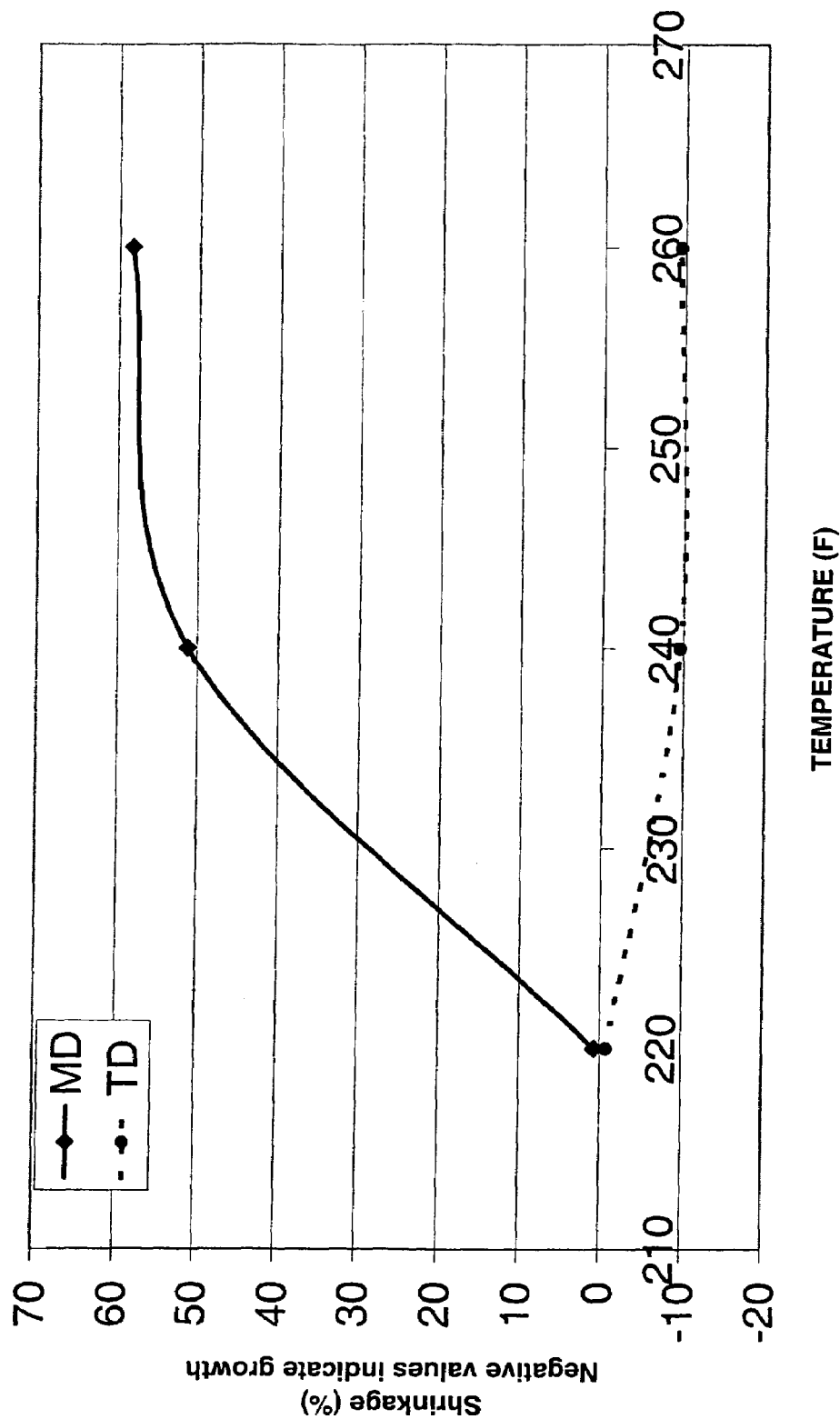

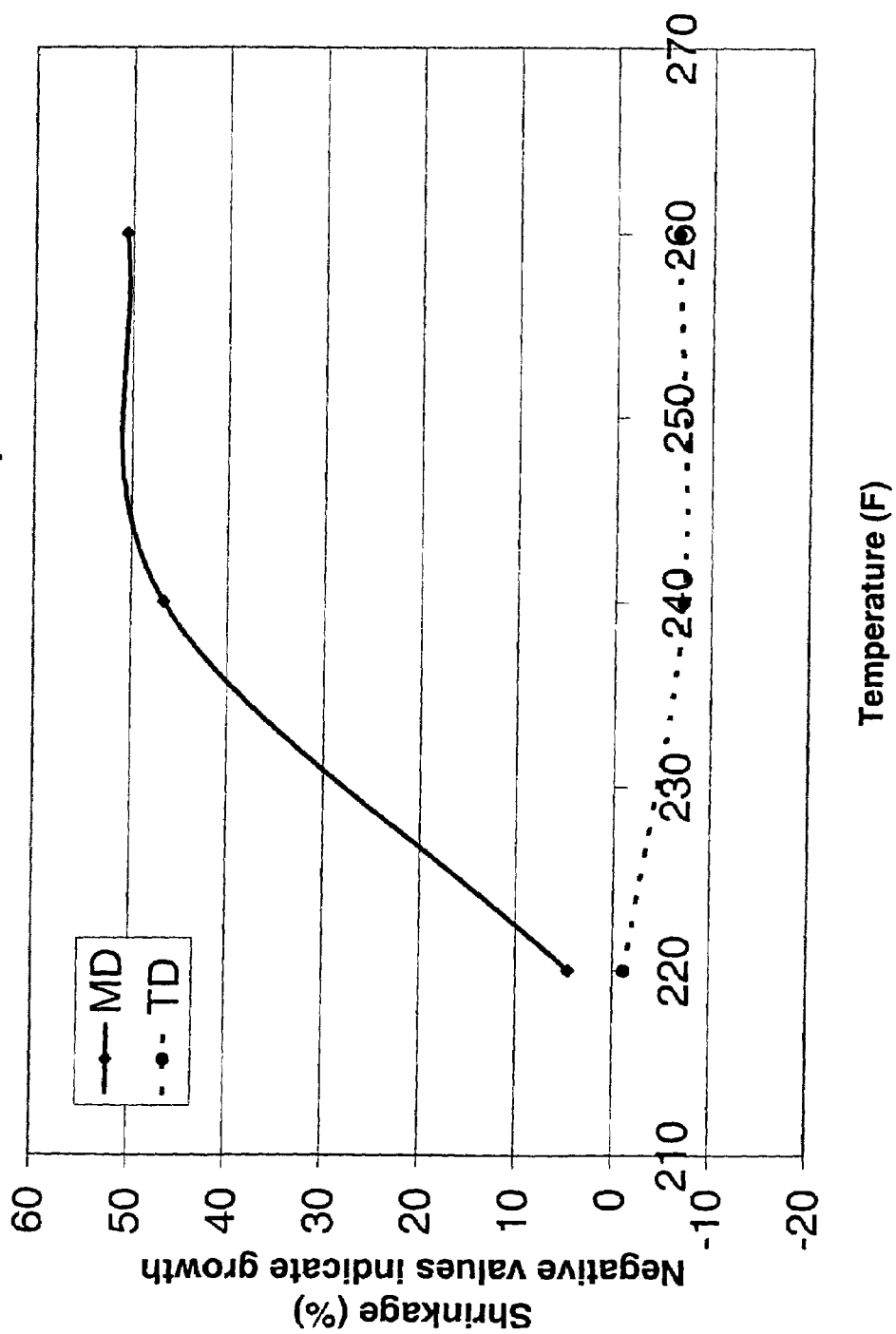

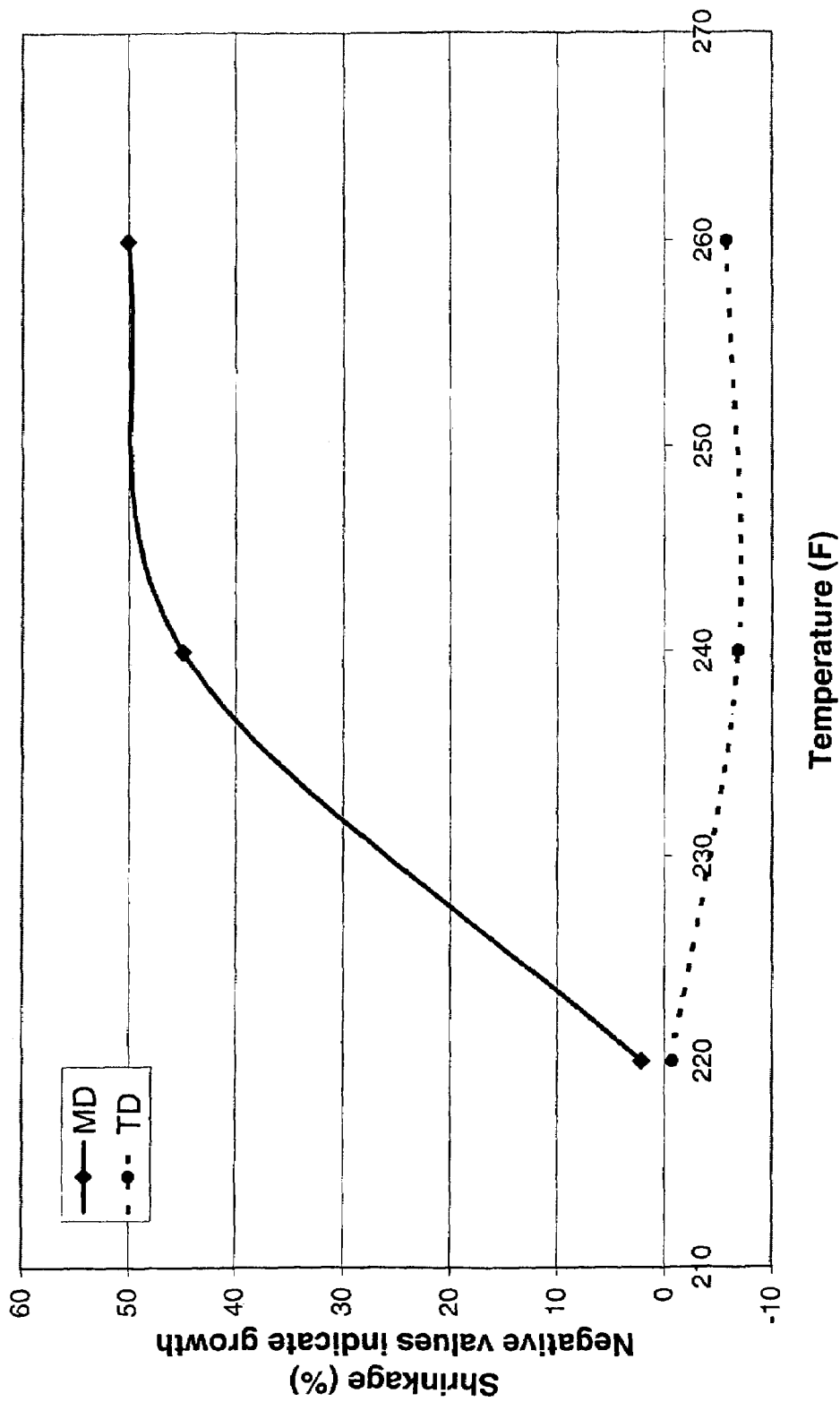

LONGITUDINAL SHRINK FILMS

CROSS REFERENCE TO RELATED APPLICATIONS

This application is a divisional of the non-provisional U.S. patent application entitled, Longitudinal Shrink Films, filed Feb. 5, 2004, having Ser. No. 10/771,346 now U.S. Pat. No. 6,897,260 which claims priority to provisional U.S. application No. 60/445,272, filed Feb. 6, 2003, the disclosures of which are hereby incorporated in their entirety by reference.

FIELD OF THE INVENTION

The present invention relates generally to heat-shrinkable film. More particularly, the present invention relates to heat-shrinkable polystyrene films that exhibit temperature dependent shrinkage in one direction with concomitant expansion in another.

BACKGROUND OF THE INVENTION

Heat-shrinkable films have widely been used for various industrial applications, for example, such as with shrink-wrap films, shrinkable labels and cap seals, by making use of their property of heat-dependent shrinkage. The films have been applied to a variety of surfaces, including plastic and glass surfaces. Shrink films have been manufactured from vinyl chloride resins, polystyrene resins or polyester resins; however, in many instances, film shrinkage is concomitant with undesirable curling of the outer edges of the film. The undesirable curling of the outer edges has limited the application of shrink films. Therefore, there is a need for shrink films that have little to no curling.

SUMMARY OF THE INVENTION

The foregoing needs are met, to an extent, by the present invention, wherein in one aspect shrink film is provided comprised of a polystyrene polymer blend which, upon exposure to heat, exhibits shrinkage in the length direction and controlled growth in the cross direction, thus allowing the film to exhibit reduced curling of its outer edges as the film shrinks upon exposure to heat. The shrink film may exhibit shrinkage in the length direction in the range of about 10% to about 90% and exhibit a shrinkage in the cross direction in the range of about 30% to about −30% (a negative value indicates growth) when subjected to heat in a hot air oven at 120° C. after about five minutes. In some embodiments, the shrink film may exhibit shrinkage in the length direction of about 50% and exhibit shrinkage in the cross direction of about −10% (a negative value indicates growth) when subjected to heat in a hot air oven at 120° C. after about five minutes. In other embodiments, the shrink film may exhibit shrinkage in the length direction of about 30% and exhibit a shrinkage in the cross direction of about −5% (a negative value indicates growth) when subjected to heat in a hot air oven at 120° C. after about five minutes. In still yet other embodiments, the shrink film may exhibit shrinkage in the length direction of up to about 50% or greater and exhibit a shrinkage in the cross direction of up to about −10% (a negative value indicates growth) when subjected to heat in a hot air oven over a temperature range of about 220° F. to about 250° F. after about five minutes. The polystyrene polymer blend includes crystal polystyrene and elastomers, high impact polystyrene and elastomers, and/or crystal polystyrene, high impact polystyrene and elastomers. The polystyrene polymer blend may include 48 parts crystal polystyrene, 2 parts high impact polystyrene and 50 parts elastomers. In other embodiments, polystyrene polymer blends include 33 parts crystal polystyrene, 2 parts high impact polystyrene and 65 parts elastomers. In yet other embodiments, polystyrene polymer blends include 68 parts crystal polystyrene, 2 parts high impact polystyrene and 30 parts elastomers.

In accordance with another embodiment of the present invention, a packaged good is provided comprising a consumable item and a heat treated film wrapped around at least a portion of the consumable item, which heat treated film is obtained by exposing to heat a shrink film comprised of a polystyrene polymer blend which exhibits shrinkage in the length direction and controlled growth in the cross direction upon exposure to heat. The packaged good may be a consumable item including batteries, cans, bottles, disposable lighters, pens and decorative items. The film may form a perforated or non-perforated neck band around the consumable item and may be clear, matte, translucent, or opaque. The packaged good with the heat treated film may include a packaging label and the label may be printed onto the film.

In yet another embodiment of the present invention, a method of making a shrink film comprising (a) providing pellets of a polystyrene polymer blend, (b) drying the pellets, (c) melting the pellets to form a molten mass at a desired viscosity value or range of values, (d) increasing the viscosity of the molten mass, (e) stretching the resulting molten mass to form a film, and (f) annealing the resulting film. The drying step of the method may be carried out in an air dryer. The melting step may be carried out at a temperature range of about 150° C. to about 300° C., about 180° C. to about 270° C., or at a temperature of about 200° C. The first viscosity may range from about 3,000 P to about 6,000 P, about 4,000 P to about 5,000 P, or be about 4,500 P, at about 240° C. and an apparent shear rate of about 55 seconds$^{-1}$. The second viscosity may range from about 16,000 P to about 19,500 P, about 16,500 P to about 18,000 P, or be about 17,500 P, at about 180° C. and an apparent shear rate of about 55 seconds$^{-1}$. The viscosity increasing step may be carried out in a polymer cooling unit, and the unit may be a Koch polymer cooling unit adapted for polystyrene use. The stretching step of the method may be carried out using a blown film orientation process. The annealing step of the method may be carried out at a temperature ranging from about 25° C. to about 200° C., about 30° C. to about 175° C., about 50° C. to about 100° C., or about 90° C.

In still yet another embodiment of the present invention, a method of increasing the viscosity of a polystyrene polymer blend suitable for shrink films is provided, comprising (a) providing pellets of a polystyrene polymer blend, (b) melting the pellets to form a molten mass at a first desired viscosity value or range of values, and (c) cooling the molten mass to a second desired viscosity value in a polymer cooling unit. The melting step may be carried out at a temperature range of about 150° C. to about 300° C., about 180° C. to about 270° C., or at a temperature of about 200° C. The first viscosity may range from about 3,000 P to about 6,000 P, about 4,000 P to about 5,000 P, or be about 4,500 P, at about 240° C. and an apparent shear rate of about 55 seconds$^{-1}$. The second viscosity may range from about 16,000 P to about 19,500 P, about 16,500 P to about 18,000 P, or be about 17,500 P, at about 180° C. and an apparent shear rate of about 55 seconds$^{-1}$. The viscosity increasing step may be carried out in a polymer cooling unit, and the unit may be a Koch polymer cooling unit adapted for polystyrene use. The second viscosity may range from about two times to about ten times, about four times to about eight times, or about six times that of the first viscosity value.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a graph depicting the percent shrinkage of a POLYFLEX LMOPS 120 Gauge film of the present invention at a given temperature for five minutes. The solid line represents shrinkage in the length direction and the dotted line represents expansion in the cross direction.

FIG. 2 is a graph depicting the percent shrinkage of a POLYFLEX LMOPS 160 Gauge film of the present invention at a given temperature for five minutes. The solid line represents shrinkage in the length direction and the dotted line represents expansion in the cross direction.

FIG. 3 is a graph depicting the percent shrinkage of a POLYFLEX LMOPS 200 Gauge film of the present invention at a given temperature for five minutes. The solid line represents shrinkage in the length direction and the dotted line represents expansion in the cross direction.

DETAILED DESCRIPTION

In one embodiment of the instant invention, plastic films and a method of their manufacture are described. The polymer films are generated that, when heat treated, shrink in the machine direction and expand in the cross direction. This shrinkage and expansion may occur simultaneously. The machine direction will be defined herein as the "longitudinal" or "length" direction. The "cross direction" or "cross web direction" will be defined herein as the direction perpendicular to the machine direction. Embodiments of films described herein exhibit reduced edge-curling characteristics and can be produced in clear, matte, translucent colors and opaque colors. Films of the present invention may be suitable for back side and/or front side printing.

Films of the present invention may comprise various polymers and polymer grades known in the art. Preferably, in some embodiments, polymers are selected that, when used alone or in a blend, enable "memory" to be stored from an orienting process described herein. Many of the determinants for polymer selection are known to one or ordinary skill in the art and/or will be apparent from the teachings herein. For example, where high temperature processing is desired, polymers with higher softening points may be selected, such as, for example, high molecular weight polymers.

Polymer classes that may be suited for the present invention, include, but are not limited to, crystal polystyrene, high impact polystyrene, and elastomers. In each of the aforementioned classes, various grades of the respective polymers are also included.

Crystal polystyrene is a polymer that can provide stiffness, heat resistance, gloss, and clarity (for clear films). All grades may be used in the present invention; however a melt flow of about 2 and a molecular weight of 350,000 (wt. avg.) is preferred. Preferred characteristics of crystal polystyrene may include a melt flow that ranges from about 0.7 to about 40 (ASTM D-1238G). The molecular weight (Weight Average) preferably ranges from 180,000 to 475,000 (ASTM D-3593), and more preferably ranges from 300,000 to 350,000, and even more preferably is 350,000. The term "about" has been incorporated herein to account, for example, for the inaccuracies inherent and present in such measurements known in the art.

High impact polystyrene polymers can provide slip (anti-blocking) and anti-scratching characteristics, and all grades can be used in the present invention. These polymers comprise a combination of crystal polystyrene and butadiene rubber particles. Rubber particle sizes may range from about 1 micron to about 10 microns (high impact only), and preferably about 3 to about 4 microns in some embodiments. Without being limited to or bound by theory, it is thought that the rubber blooms to the surface during orienting which aids in creating a void between film layers. The void, comprising an air pocket between film layers, is one factor in determining anti-blocking and anti-scratching characteristics of the film.

High impact polystyrene may have a melt flow that ranges from about 0.7 to about 40 (ASTM D-1238G), and preferably a melt flow of about 2.0. The molecular weight (Weight Average) of the polymers may range from 180,000 to 475,000 (ASTM D-3593), more preferably between 300,000 to 350,000, and even more preferably is 350,000.

Synthetic polymers (also known as "elastomers") are thought to provide strength, flexibility and may be a significant component in storing the shrink memory. Synthetic polymers are known in the art, and commonly supplied as a blend of a synthetic rubber and a "carrier resin." The carrier resin is often crystal polystyrene, high impact polystyrene, or a combination thereof, but may comprise other polymers as well. Synthetic rubbers that may be used in some embodiments of the current invention include, but are not limited to, styrene isoprene styrene (SIS), styrene butadiene styrene (SBS), and styrene butadiene—also known as SB block copolymer. All grades can be used, including branched or linear molecular structures.

For certain applications, synthetic polymers are commonly supplied in the art as 75% of a carrier resin and 25% of a synthetic rubber, which is the maximum amount of synthetic rubber that may be used and still meet FDA compliance 21 CFR 177.1810. However, other formulations are available, both with more or less synthetic rubber, and various types and grades of synthetic rubbers are also available and may be incorporated in the invention.

Synthetic polymers in some embodiments may have a melt flow that ranges from about 0.7 to about 40 (ASTM D-1238G), and more preferably about 8.0. The molecular weight (Weight Average) of the polymers may range from 100,000 to 500,000 (ASTM D-3593), and more preferably is 250,000.

In some embodiments, polymers for films may be selected from one, two or each of three groups mentioned and combined to create blended polymer films. Table 1 provides a listing of formulations that may be suitable in the preparation of films of the present invention. For clarity in description, a skilled artisan should appreciate from the teachings herein that the percent of crystal polystyrene and the percent of butadiene in "high impact polystyrene" have not been listed. However, it should be appreciated that high impact polystyrene is a combination of the two polymers, and for the first 17 formulations, "high impact polystyrene" is, in fact, about 92% crystal polystyrene and about 8% butadiene.

Similarly, elastomers are commercially available as a combination of a carrier resin and a synthetic rubber. Column 4 lists the percentage of "elastomer", where the elastomer comprises 75% crystal polystyrene and 25% synthetic rubber. Column 5 provides the net synthetic rubber in the composition in the complete formulation.

TABLE 1

Polymer Formulations

| Formulation No | Crystal PS | HIPS | Elastomer/ Synthetic Polymer | Net Synthetic Rubber |
|---|---|---|---|---|
| 1) | 68% | 2% | 30% | 7.50% |
| 2) | 63% | 2% | 35% | 8.75% |
| 3) | 58% | 2% | 40% | 10% |
| 4) | 53% | 2% | 45% | 11.25% |
| 5) | 48% | 2% | 50% | 12.50% |
| 6) | 47% | 3% | 50% | 12.50% |
| 7) | 49% | 1% | 50% | 12.50% |
| 8) | 43% | 2% | 55% | 13.75% |
| 9) | 38% | 2% | 60% | 15% |
| 10) | 33% | 2% | 65% | 16.25% |
| 11) | 34% | 1% | 65% | 16.25% |
| 12) | 28% | 2% | 70% | 17.50% |
| 13) | 23% | 2% | 75% | 18.75% |
| 14) | 24% | 1% | 75% | 18.75% |
| 15) | 18% | 2% | 80% | 20% |
| 16) | 13% | 2% | 85% | 21.25% |
| 17) | 14% | 1% | 85% | 21.25% |
| 18) | 0% | 100% | 0% | 0% |
| 19) | 0% | 95% | 5% | 1.25% |
| 20) | 0% | 90% | 10% | 2.50% |
| 21) | 0% | 85% | 15% | 3.75% |
| 22) | 30% | 60% | 10% | 2.50% |
| 23) | 15% | 50% | 35% | 8.75% |
| 24) | 50% | 30% | 20% | 5% |
| 25) | 60% | 20% | 20% | 5% |
| 26) | 25% | 15% | 60% | 15% |
| 27) | 20% | 10% | 70% | 17.50% |
| 28) | 10% | 10% | 80% | 20% |
| 29) | 10% | 5% | 85% | 21.25% |

The blends in Table 1 may be chosen or prepared to create the "feel" or flexibility of the film to match an end use application. In the formulations in Table 1, increasing the net synthetic rubber in a given composition may increase the flexibility of the film, such that films of the first formulations are not as ductile as the seventeenth. Also, films prepared from formulations 18–21 are considered "semi-clear" by virtue of their high butadiene content.

Where all other processing parameters are equal, the molecular weights and/or the melt indices of both the elastomer and crystal polystyrene could be used to adjust the shrink curve of the film to match the end use. For example, lower molecular weight polymers have a lower softening point which moves the shrink curve to the left. Also, the melt index of the elastomer and the crystal polystyrene should be matched as close as possible in some embodiments, and preferably, in other embodiments, no more than a difference of 6 g flow/10 min at 200° C. (ASTM D-1238G) is desirable.

In a preferred embodiment, films are produced with a blend of 70% crystal/high impact polystyrene and 30% elastomers. More preferably, in some embodiments, the 70% crystal/high impact polystyrene is predominantly crystal polystyrene, for example 68% crystal polystyrene and 2% high impact polystyrene.

Processing

After the polymer composition of the film is selected, the polymer is then processed to generate a film with desirable shrink properties. Generally, the polymers are procured in pellets or grains. In cases where multiple polymers are to be included, the polymers pellets are first dry blended. That is, the pellets are mixed together. The processing there from essentially comprises five steps: drying, extrusion, temperature conditioning, orienting, and annealing. Details of each processing step will now be described.

The blended polymer pellets are first dried by heating in a dryer to remove surface moisture. In some embodiments, a hot air dryer is used; however, a variety of air dryers are known in the art and many of them may be suitable for drying. The present invention need not be limited to air dryers only, but may include other types of dryers, including baking ovens. The temperature and duration of drying may be dependent on the total amount and condition of the polymer(s) (i.e., the amount of starting surface moisture), and may need to be adjusted on a batch-by-batch basis. Preferably, the polymers experience little to no melting in this step. By way of example, typical drying conditions require that temperatures range from about 27° C. to about 94° C., for variable periods of time. In some embodiments, polymers are heated to 60° C. for 3 hours before further processing. The drying is thought to increase the likelihood of high level clarity where clear shrink films are desired.

Extrusion, the second processing step, is whereby the pellets are melted into a low viscosity molten mass, thus combining the heretofore individual polymer beads or grains into one molten mass. The viscosity of the melt will depend on the temperature. Temperatures can range from about the temperature at which the polymers will remain melted to about the temperature where degradation of the polymers begins to occur. By way of example, extrusion melt temperatures may be maintained between about 160° C. to about 288° C. for certain polymer blends, but may ultimately depend on the different polymers that have been blended and their respective melting points. In some embodiments, 200° C., is preferred.

By way of example, the viscosity of 100% SBS polymer (comprising 75% crystal polystyrene and 25% butadiene rubber), at 240° C. and an apparent sheer rate of about 5.5 seconds$^{-1}$ in a capillary rheometer, may range from about 6,000 poise (P, dyne/cm$^2$) to about 11,000 P, preferably about 8,000 P to about 10,000 P, and more preferably, about 9,000 P. At a shear rate of about 55 seconds$^{-1}$ the same polymer at 240° C. may have an apparent viscosity that ranges from about 3,000 P to about 6,000 P, preferably about 4,000 P to about 5,000 P, and more preferably, about 4,500 P.

The third step, temperature conditioning, is done to increase the viscosity of the molten polymers, which makes the melt manageable for further processing. It is thought that by increasing the viscosity, a smoother film surface than without this step is generated. A smoother surface aids in the printing process that is performed in many end applications, such as, for example, labels.

The cooling step may be accomplished by a variety of methods known in the art. However, it has now been found and that the use of a polymer cooler at this step in processing may enable more precise temperature control. It is believed that temperature control over the orienting process which follows the controlled cooling step allows for a controlled shrink memory to be stored in the film.

A variety of coolers are known in the art and may be used by one of ordinary skill in the art based on the teaching provided herein. However, A Koch Engineering SIR polymer cooling unit, available from Sulzer Chemtech, USA of Tulsa, Okla., adapted for polystyrene use may be preferred in some applications.

The polymer cooler operating temperature range is preferably between about 160° C. to about 190° C. Higher temperatures may be used, but such higher temperatures may also lead to less shrinkage of the film. The temperature and duration of cooling can again depend on both the amount of polymer being cooled and the film properties that may be desired. For example, generally, a reduction in temperature is correlated with an increase in shrinkage.

In one example, the viscosity of 100% SBS polymer (comprising 75% Crystal polystyrene and 25% butadiene rubber), at 180° C. and an apparent sheer rate of about 5.5 seconds$^{-1}$ in a capillary remoter, may range from about 60,000 P to about 80,000 P, preferably about 65,000 P to about 75,000 P, and more preferably, about 71,000 P. At a shear rate of about 55 seconds$^{-1}$ the same polymer at 180° C. may have an apparent viscosity that ranges from about 16,000 P to about 19,500 P, preferably about 16,500 P to about 18,000 P, and more preferably, about 17,500 P. It will be apparent from the data presented herein that the polymer cooling step can increase the viscosity from about 2 to about 10 times that of the polymer coming out of the extruder. In other embodiments, the viscosity may be increased about 5 to about 9 times.

The fourth step in preparation of films of the present invention is orienting, also known as stretching. Orienting can be accomplished by many methods and associated equipment known to one of ordinary skill in the art, including, for example, machine direction orientation and blown film orientation. All methods are preferably designed to first control the temperature of the polymer, followed by a controlled stretching operation.

In a preferred embodiment of the present invention, the polymer melt is already pre-cooled, preferably in a polymer cooler, and then submitted to a blown film orientation process. Pre-cooling the polymer in a polymer cooler before blown film orienting is believed to be unique. The process of the present invention has one significant advantage in that a very controlled temperature—from the post extrusion temperature conditioning—can be achieved prior to the formation of a bubble. A blown film extrusion process blows molten plastic polymer through a die of circular cross-section into a bubble using an air jet. Once the plastic has been blown out, rollers flatten it into a sheet of double-thickness film. It can then be cut to form two sheets of film. The sheets of film can then be cut to desired length.

In the preferred embodiment then, by virtue of pre-cooling the melted polymer, only a final fine tuning of orienting temperature is performed, where desired, during the orientation process. In other words, the greater share of temperature conditioning takes place prior to orienting and not during orienting. Where a fine tuning of temperature is desired, it can be relatively easily accomplished by a temperature controlled air ring, which blows chilled air at the base of the bubble.

The orienting process imparts the shrink memory into the film where it is stored by the different polymers that are used. Die parameters may range from 1:0.75 BUR (Blown Up Ratio) to about 1:3 BUR, and preferably, about 1:1.4 BUR in the cross web direction. In the length (or machine) direction, die parameters may range from about 1:1 draw down ratio to about 1:300 draw down ratio, and preferably, about 1:130 draw down ratio. Orienting temperatures of the present invention range from about 65° C. to about 160° C., and more preferably, about 120° C.

Annealing, also called relaxation, is the final step in the preparation of films of the instant invention. Annealing is generally accomplished post orienting, and performed at temperatures between about 27° C. to about 176° C. in some embodiments, and more preferably at 90° C. This process is accomplished by rotating heated cylinders that contact the film just prior to the winding process where the finished roll of plastic film is generated.

Film properties using the aforementioned protocol can be manipulated as desired with nominal trial and error by one of ordinary skill in the art. Such variations are expected and are incorporated into the scope of the invention. Films of the instant invention, can generally have characteristics that fall into the following ranges:

Film Shrinkage at about 120° C. for about 5 minutes in air:
Longitudinal direction: about 10% to about 90%, with an average of about 50%.
Cross direction: about +30% (shrinkage) to about −30% (growth), with an average of about −5%.

FIGS. 1, 2, and 3 show the percent shrinkage as a function of temperature of 120 gauge (0.0012 in.), 160 gauge (0.0016 in.), and 200 gauge (0.002 in.) films, respectively. The films were prepared from a blend of about 68% crystal polystyrene, about 30% elastomers and about 2% high impact polystyrene. Using the preferred process described above, the blend was dried at 60° C. for about 3 hours, extruded at about 200° C., and cooled in a polymer cooler to below 190° C. The cooled polymer was subsequently blow film oriented at 120° C. and finally annealed at 90° C. Die ratios were 1:1.4 in the cross web direction and 1:130 in the machine direction.

The respective films were placed in a hot air dryer at the temperature shown for about five minutes and the shrinkage in the longitudinal direction and the cross direction as a percentage of the original dimensions is plotted. As is evident from the results, the films described exhibit positive shrinkage in the longitudinal direction and negative shrinkage (i.e., growth or expansion) in the cross direction at all the temperatures tested.

This growth in the cross direction can prevent the label from curling back on the edges during the shrinking process. Accordingly, in one embodiment, films of the present invention may have application in roll to roll (i.e., wrap around) labeling of various shaped cylinders such as, for example, batteries, cans, bottles, disposable lighters, pens and other decorative items. However, the scope of applications should not be limited to the aforementioned consumer products or uses.

Films of the present invention have innumerable other applications. For example, these films can also be used in printed/unprinted application for holding together twin packs, attachments, neck bands, and perforated neck bands for decoration or tamper evident use, to name a few options.

The many features and advantages of the invention are apparent from the detailed specification, and thus, it is intended by the appended claims to cover all such features and advantages of the invention, which fall within the spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, fall within the scope of the invention.

What is claimed is:

1. A method of increasing the viscosity of a polystyrene polymer blend suitable for shrink films, comprising (a) providing pellets of a polystyrene polymer blend, (b) melting the pellets to form a molten mass at a first viscosity value or range of values, and (c) cooling the molten mass to a second viscosity value or range of values in a polymer cooling unit.

2. The method of claim 1 in which the second viscosity value falls in the range of about two times to about ten times the first viscosity value.

3. The method of claim 1 in which the second viscosity value falls in the range of about four times to about eight times the first viscosity value.

4. The method of claim 1 in which the second viscosity value falls about six times the first viscosity value.

* * * * *